J. C. McNEES.
VEHICLE BRAKE.
APPLICATION FILED JAN. 3, 1908.
910,946.
Patented Jan. 26, 1909.
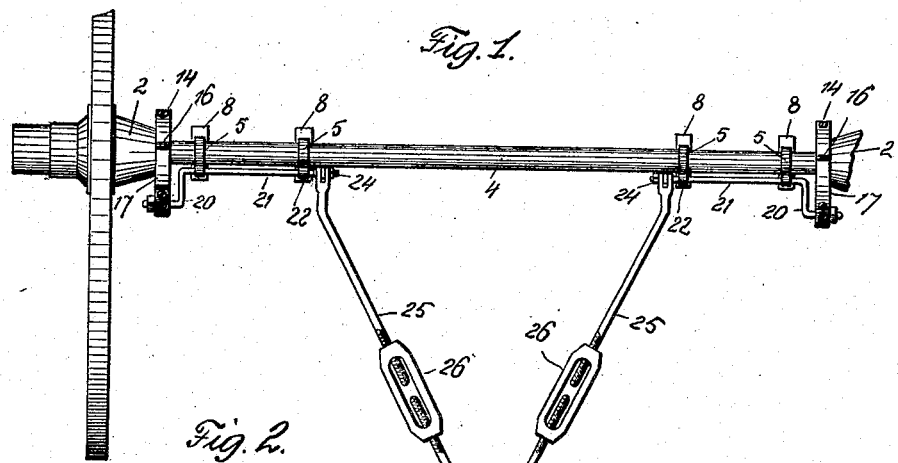
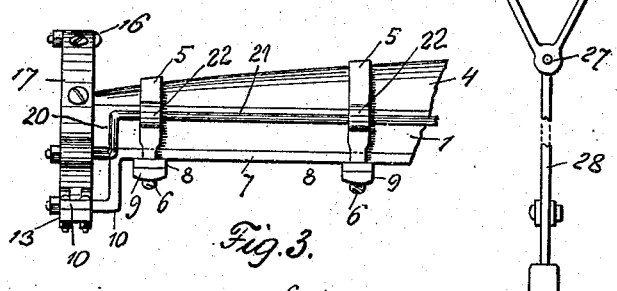
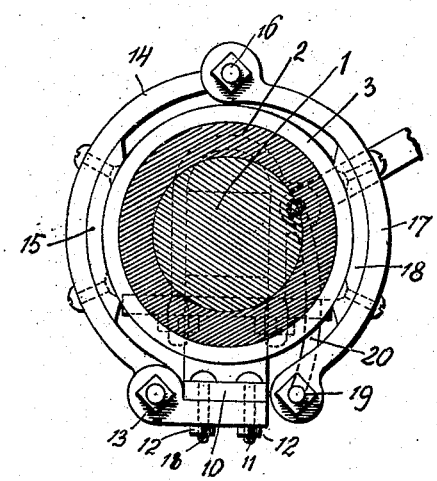
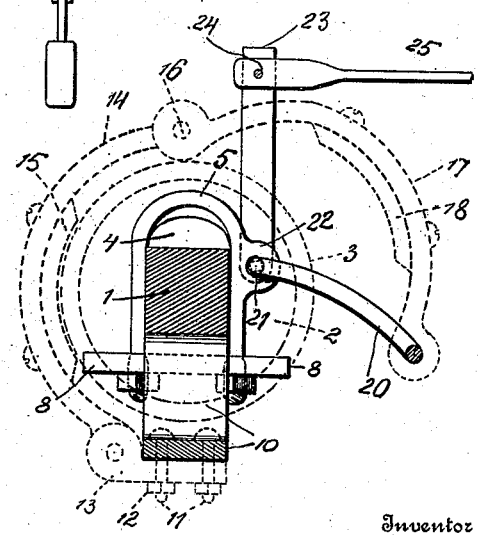
Inventor
J. C. McNEES,
Witnesses

UNITED STATES PATENT OFFICE.

JOHN C. McNEES, OF WEST LIBERTY, PENNSYLVANIA.

VEHICLE-BRAKE.

No. 910,946.  Specification of Letters Patent.  Patented Jan. 26, 1909.

Application filed January 3, 1908. Serial No. 409,110.

*To all whom it may concern:*

Be it known that I, JOHN C. McNEES, a citizen of the United States of America, residing at West Liberty, in the county of Butler and State of Pennsylvania, have invented certain new and useful Improvements in Vehicle-Brakes, of which the following is a specification, reference being had therein to the accompanying drawing.

This invention relates to brakes for vehicles, and the primary object of the invention is, to provide a simple and inexpensive friction brake that can be easily operated to retard the rotary movement of a wheel.

Another object of this invention is the provision of novel means for exerting a pressure upon the hub of a wheel that will tend to stop the movement of the same.

A further object of this invention is to provide a strong and durable brake mechanism, wherein the use of ordinary brake shoes ordinarily employed for engaging the tire of a wheel are dispensed with.

With the above and other objects in view which will more readily appear as the invention is better understood, the same consists in the novel construction, combination and arrangement of parts to be hereinafter described, and then specifically pointed out in the appended claim.

In the drawings: Figure 1 is a plan of my brake mechanism, Fig. 2 is a front elevation of a portion of the same, Fig. 3 is a side elevation of the brake bands in a closed position, and Fig. 4 is a similar view illustrating one of the yokes and brackets of the brake mechanism with the brake bands in dotted lines.

In the accompanying drawings, 1 designates an axle of a vehicle, preferably the rear axle. Upon this axle are journaled wheels, said wheels comprising hubs 2 having bands 3 suitably secured thereto.

Mounted upon the axle 1 is a bolster 4, said bolster being secured to the axle by yokes 5 having threaded ends 6.

Mounted upon the underneath side of the axle 1 is a bar 7, this bar being retained in engagement with the axle 1 by straps 8 placed upon the threaded ends 6 of the yokes 5, the nuts 9 retaining the straps 8 in position. The ends of the bar 7 are bent downwardly to provide brackets 10. Secured to the brackets 10 by bolts 11 and nuts 12 are hinge members 13 for semi-cylindrical brake bands 14, these bands carrying detachable bearing blocks or shoes 15. Pivotally connected to the brake bands 14, as at 16 are semi-cylindrical brake bands 17, these bands having bearing blocks or shoes 18 similar to the bearing blocks or shoes 15.

The friction shoes 15 and 18 are of a length considerably less than the brake bands 14 and 17 respectively, and are located on the inner face of said brake bands, substantially mid-way between the ends thereof, the friction shoes 15 engaging the friction band 3 on the side opposite to that engaged by friction shoes 18, and the brake bands 14 and 17 are thereby held out of contact with the friction bands 3 at all points throughout their length. This construction affords a greater range of closing movement to the brake bands, since the same are out of contact with the friction bands 3 at points beyond the ends of the friction shoes, thus allowing a greater pressure to be exerted against the friction shoes than would be possible if the brake bands engaged the friction band at any point, or than would be possible if the friction shoes engaged the entire periphery of the friction band.

The free ends of the brake bands 17 are detachably connected as at 19 to the cranks 20 of shafts 21, these shafts being journaled in bearings 22 carried by the yokes 5. The shafts 21 are provided at their opposite or innermost ends with cranks 23, these cranks being pivotally connected, as at 24, to a V-shaped member, said member comprising rods 25, provided with turn buckles 26. The V-shaped member is connected, as at 27, to a guiding rod 28, this rod extending to a suitable brake operating mechanism (not shown) used in connection with a vehicle for operating the brakes thereof.

In operation, a forward movement of the V-shaped member rotates the shafts 21 sufficiently to first throw the brake bands 17 inwardly towards the hub bands 3, and a further movement of the shafts 21 causes the gripping blocks 15 and 18 of the brake bands 14 and 17 to frictionally engage the hub bands 3 and retard the rotary movement of the hubs 2.

The hub bands 3 and the gripping blocks 15 and 18 can be easily renewed when the same have become worn.

By adjusting the V-shaped member, through the medium of the turn buckles 26, the amount of movement on part of the brake bands and shafts 21 can be easily regulated.

I do not care to confine myself to the type of vehicle in connection with which the brake is used, and such changes in the structural details as are permissible by the appended claims can be resorted to without departing from the scope of the invention.

Having now described my invention what I claim as new, is:—

In a brake, the combination with a wagon axle, hubs journaled thereon, friction bands carried by said hubs, a bar arranged against the underneath face of said axle and provided at its ends with depending angle-shaped brackets, clips mounted on the axle and maintaining said bar in position, said clips provided with laterally extending bearings, of transversely extending hinge members secured to the lower faces of the lower arms of said brackets, brake band sections, one of said sections hinged at the lower end to one end of said hinge members, a second set of brake band sections hinged to the upper ends of the first mentioned brake band sections and having a greater range of movement than the first mentioned brake band sections, friction shoes carried on the inner faces of said brake band sections and of less length than the said sections, the friction shoes upon one brake band section being diametrically opposed to the friction shoes upon the other brake band section, the brake band sections being held throughout out of contact with the friction bands, shafts journaled in the bearings of said axle clips and each provided with a curved crank at its outer end, said cranks connected to the lower ends of said second named brake band sections, each of said shafts provided at its inner end with a crank arm, an operating lever and adjustable connections between said operating lever and the crank arms on the inner ends of said shafts.

In testimony whereof I affix my signature in the presence of two witnesses.

JOHN C. McNEES.

Witnesses:
MAX H. SROLOVITZ,
THOS. G. McNEES.